United States Patent
Wittrock et al.

(10) Patent No.: US 9,206,722 B2
(45) Date of Patent: Dec. 8, 2015

(54) METHOD FOR REDUCING NITROGEN OXIDE LEVELS IN DIESEL ENGINE EXHAUST GASES

(71) Applicant: Deutz Aktiengesellschaft, Cologne (DE)

(72) Inventors: Meike Wittrock, Bergisch-Gladbach (DE); Oliver Swiatlak, Solingen (DE)

(73) Assignee: Deutz AG, Cologne (DE)

( * ) Notice: Subject to any disclaimer, the term of this patent is extended or adjusted under 35 U.S.C. 154(b) by 109 days.

(21) Appl. No.: 13/940,680

(22) Filed: Jul. 12, 2013

(65) Prior Publication Data

US 2014/0020364 A1  Jan. 23, 2014

(30) Foreign Application Priority Data

Jul. 14, 2012 (EP) ................................ EP12005203

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *B01D 53/94* | (2006.01) |
| *F01N 13/00* | (2010.01) |

(52) U.S. Cl.
CPC ............... *F01N 3/10* (2013.01); *B01D 53/9418* (2013.01); *B01D 53/9495* (2013.01); *F01N 3/208* (2013.01); *F01N 13/0093* (2013.01); *F01N 13/0097* (2013.01); *B01D 53/9477* (2013.01); *B01D 2251/2062* (2013.01); *B01D 2257/406* (2013.01); *B01D 2258/012* (2013.01); *F01N 2560/021* (2013.01); *F01N 2560/026* (2013.01); *F01N 2610/02* (2013.01); *F01N 2900/0418* (2013.01); *Y02T 10/24* (2013.01)

(58) Field of Classification Search
USPC .................................. 60/286, 295, 299, 301
See application file for complete search history.

(56) References Cited

U.S. PATENT DOCUMENTS

| | | | |
|---|---|---|---|
| 2004/0258594 A1 | 12/2004 | Andreasson et al. | |
| 2007/0240402 A1 | 10/2007 | Andreasson et al. | |
| 2009/0272099 A1 | 11/2009 | Garimella et al. | |
| 2009/0272101 A1 | 11/2009 | Wills et al. | |
| 2010/0199646 A1 | 8/2010 | Andreasson et al. | |
| 2010/0242440 A1 | 9/2010 | Garimella et al. | |
| 2011/0286903 A1 | 11/2011 | Andreasson et al. | |
| 2012/0017568 A1* | 1/2012 | Geveci et al. | 60/274 |

FOREIGN PATENT DOCUMENTS

| | | |
|---|---|---|
| DE | 10 2006 051 790 | 5/2008 |
| DE | 10 2008 043 141 | 5/2009 |

(Continued)

*Primary Examiner* — Jorge Pereiro
*Assistant Examiner* — Dapinder Singh
(74) *Attorney, Agent, or Firm* — Davidson, Davidson & Kappel, LLC

(57) ABSTRACT

A method is described for reducing the nitrogen oxide levels in diesel engine exhaust gases with the aid of an exhaust gas treatment system, which includes a device for feeding ammonia and/or a compound decomposing to form ammonia, and two SCR units. An ammonia sensor is situated between the first and second SCR unit. A nitrogen oxide sensor is located in the exhaust pipe downstream from the second SCR unit. The signals of the ammonia sensor and the $NO_x$ sensor are combined in a defined manner to form the actual value of a virtual $NO_x/NH_3$ sensor, which is used as the input variable for a PI or PID controller, which regulates the quantity of reducing agent to be fed into the exhaust gas as needed.

12 Claims, 4 Drawing Sheets

(56) References Cited

FOREIGN PATENT DOCUMENTS

| EP | 1 054 722 | 11/2000 |
| EP | 2 317 090 | 5/2011 |
| EP | 2 317 091 | 5/2011 |
| WO | WO2008/052756 | 5/2008 |
| WO | WO 2010/062566 | 6/2010 |
| WO | WO 2011/139971 | 11/2011 |

* cited by examiner

METHOD FOR REDUCING NITROGEN OXIDE LEVELS IN DIESEL ENGINE EXHAUST GASES

This claims the benefit of European Patent Application EP 12005203.0, filed Jul. 14, 2012 and hereby incorporated by reference herein.

BACKGROUND

To comply with the 2014 European and U.S. emission legislation (EU Stage IV and Tier 4 (final)) for non-road diesel engines, these diesel engines must be equipped with an exhaust gas cleaning system. Typical exhaust gas cleaning systems include, in addition to a diesel oxidation catalytic converter for oxidatively removing carbon monoxide and hydrocarbons, and, if necessary, a diesel particulate filter situated downstream therefrom, also a nitrogen removal unit. Units for selective catalytic reduction of nitrogen oxides with the aid of an SCR catalytic converter (SCR: Selective Catalytic Reduction), and a device for feeding ammonia or a compound decomposing to form ammonia in the exhaust gas stream to be cleaned, are typically used as the reducing agents for removing nitrogen oxides from diesel engine exhaust gases in utility and non-road vehicles. Preferred reducing agents include an aqueous urea solution or ammonium carbamate solution; particularly preferred is a urea solution. Such SCR units are typically situated downstream from an upstream diesel oxidation catalytic converter (DOC) and/or a diesel particulate filter (DPF).

To comply with the emission standards of EU Stage IV or Tier 4f, systems according to EP-B 1 054 722 or systems without diesel particulate filters (only DOC+SCR), for example, are used. In particular, in the last-named "open" systems, maximum SCR efficiencies must be achieved at all operating points even after extended operation, since the combustion process in engines, for the exhaust gas cleaning of which a system without diesel particulate filters is used, is adjusted in such a way that the lowest possible particulate emissions always occur. This causes significantly higher raw $NO_x$ emissions, so that nitrogen oxide conversion rates higher than 90% are required in the SCR unit over the entire time of operation of the system in order to reach the legal emission limit values.

Efficiencies of the SCR system are determined, in addition to the temperature and mass flow over the SCR catalyst, by the $NO_2/NO_x$ ratio upstream from the SCR catalyst and by the quantity of reducing agent fed. The $NO_2/NO_x$ ratio is adjusted via the upstream exhaust gas cleaning units DOC and/or DPF, preferably values of 0.2 to 0.7, and particularly preferably of 0.4 to 0.6 being achieved.

Feeding too little reducing agent, (for example, $\alpha=0.8$, where $\alpha$ is the molar ratio $NH_3$ to $NO_x$ in the exhaust gas to be cleaned upstream from the SCR catalytic converter) results in limiting the theoretically possible nitrogen oxide conversion corresponding to the availability of the reducing agent (i.e., for $\alpha=0.8$, max. 80% nitrogen oxide conversion). By feeding an excess of reducing agent ($\alpha>1$), the maximally thermodynamically possible nitrogen oxide conversions may be achieved over this SCR catalytic converter, which are determined only by the material properties of the catalytic converter under the given operating conditions (exhaust gas mass flow, temperature, $NO_2/NO_x$ upstream from the SCR).

However, feeding an excess of reducing agent may result in ammonia breakthroughs through the SCR catalytic converter. Since ammonia is a poisonous and environmentally hazardous gas according to the EU hazardous substances designation, residual emissions must be avoided.

Systems according to the prior art typically regulate the reducing agent feed with the support of a model, i.e., the software stored in the engine control unit computes, on the basis of the $NO_x$ level in the raw emission and the previously experimentally ascertained efficiency of the SCR catalytic converter, the stoichiometrically required quantity of reducing agent at any conceivable operating point and controls the quantity of urea solution to be fed (pre-control quantity) accordingly. This pre-control is made difficult by the fact that, in particular, SCR catalytic converters, on the basis of zeoliths exchanged by transition metals, have a significant ammonia storage capacity. The quantity of ammonia stored in the catalytic converter depends on the operating temperature and the aging condition of the catalyst. Accordingly, depending on the operating point, part of the reducing agent quantity fed is used for filling up the ammonia accumulator in the catalytic converter. The accumulator may, in particular during dynamic operation, compensate for briefly occurring underfeeds by reducing the nitrogen oxides contained in the exhaust gas by using the ammonia desorbing from the accumulator. The ammonia accumulator must then be refilled by an overfeed of reducing agent.

This accumulator function of the catalytic converter makes optimum adaptation of the pre-control model difficult, since, due to the complexity of the chemical-physical processes in the SCR catalyst, they are very difficult to describe mathematically. Model-supported regulation of the reducing agent feed therefore has the disadvantage that, in particular during the transient operation of the engine, maximum efficiencies of the SCR catalytic converter cannot be ensured at all operating points without ammonia breakthroughs.

SCR systems in which ammonia breakthroughs downstream from the SCR catalytic converter are recognized with the aid of an ammonia sensor are known from the prior art.

Thus, WO 2010/062566 discloses the construction and mode of operation of an ammonia sensor.

DE 10 2006 051 790 discloses an exhaust gas treatment system for cleaning exhaust gases of an internal combustion engine, including in the direction of flow of the exhaust gas, in this order, a first oxidation catalytic converter, a device for introducing fuel into the exhaust gas tract, a second oxidation catalytic converter, a diesel particulate filter, a device for injecting a reducing agent that is effective in reducing nitrogen oxides, an SCR catalytic converter, and, in some cases, an ammonia anti-slip catalyst having an oxidation catalytic effect. Downstream from the SCR catalytic converter, an ammonia sensor may be provided for improving the regulation of the reducing agent feed or for diagnostic purposes.

EP-A-2 317 091 discloses an exhaust gas cleaning system including, in the direction of flow of the exhaust gas, in this order, an oxidation catalytic converter, an exhaust pipe having a feeding device for urea solution and an SCR catalytic converter. A temperature sensor is integrated into the SCR catalytic converter. Downstream from the SCR catalytic converter, an ammonia sensor is provided for detecting the ammonia concentration in the exhaust gas downstream from the SCR catalytic converter. An ammonia oxidation catalytic converter may be situated downstream from the ammonia sensor. In the system disclosed in EP-A-2 317 091, a quantity of urea solution to be fed (pre-control quantity) is determined and fed as a function of the rotational speed and torque of the engine. At the same time, the ammonia storage capacity of the SCR catalytic converter is computed from the time delay between the start of feed and the beginning ammonia slip. If an ammonia slip is shown by the ammonia sensor downstream from the SCR catalytic converter, the quantity of urea solution to be actually fed is reduced with respect to the pre-control quantity. If the computation of the ammonia storage capacity of the SCR catalytic converter provides a value that is less than a reference value stored in the control software, the quantity of urea solution to be actually fed is increased with respect to the pre-control quantity.

EP-A-2 317 090 discloses a method for operating an SCR system, in which the reducing agent feed is preventively reduced when ammonia breakthroughs through the SCR catalytic converter are to be expected due to the operating conditions. Such changes in the operating conditions include, in particular, changes in the exhaust gas mass flow and/or a rise in the exhaust gas temperature. EP-A-2 317 090 also discloses a method for detecting an ammonia slip risk with the aid of an ammonia sensor situated between two SCR catalytic converters. If a predefined ammonia slip is exceeded downstream from the first upstream SCR catalytic converter, the reducing agent feed is discontinued.

DE 10 2008 043 141 discloses an exhaust gas cleaning system for a diesel engine, including, in the direction of flow of the exhaust gas, in this order, a diesel oxidation catalytic converter, a device for feeding ammonia into the exhaust gas tract, an SCR catalytic converter, an $NO_x$ sensor for detecting nitrogen oxides in the exhaust gas, an ammonia oxidation catalytic converter, a device for feeding water into the exhaust gas tract, and an ammonia sensor. If an ammonia concentration exceeding a predefined value is detected in the exhaust gas by the ammonia sensor downstream from the ammonia oxidation catalytic converter, water is fed into the exhaust gas tract downstream from the ammonia oxidation catalytic converter in order to "capture" the ammonia present in the exhaust pipe and thus prevent the escape of ammonia into the atmosphere.

US 2009/0272099 and US 2010/0242440 disclose exhaust gas treatment systems including, in the direction of flow of the exhaust gas, in this order, an oxidation catalytic converter, a diesel particulate filter, a device for feeding a reducing agent such as ammonia or a urea solution, an SCR catalytic converter, and an ammonia oxidation catalytic converter. Ammonia sensors may be situated downstream from the ammonia oxidation catalytic converter, upstream from the SCR, and/or upstream from the ammonia oxidation catalytic converter. They are supplemented by $NO_x$ sensors for detecting the nitrogen oxide level in the exhaust gas upstream from the diesel oxidation catalytic converter, downstream from the SCR and/or downstream from the ammonia oxidation catalytic converter. With the aid of these sensor signals, the actual reducing agent feed rates are adjusted in such a way that suboptimum reducing agent feed rates occurring due to errors or inaccuracies in the pre-control model (e.g., modeling errors, deviations in the actual efficiencies due to catalyst aging or sensor aging, deviations in the reducing agent concentration, injection delays) are corrected.

WO 2011/139971 discloses a method for operating an SCR system which has two SCR catalytic converters situated in series in the direction of flow of the exhaust gas, and an ammonia sensor between the two SCR catalytic converters, as well as an $NO_x$ sensor downstream from the second, downstream SCR catalytic converter. The method is characterized by the fact that the predefined value for the ammonia concentration in the exhaust gas prevailing between the two SCR catalytic converters, which is determined with the aid of the ammonia sensor, is modified or adjusted as a function of the $NO_x$ concentration determined with the aid of the $NO_x$ sensor in the exhaust gas downstream from the second SCR catalytic converter.

SUMMARY OF THE INVENTION

It is an object of the present invention to provide a method for reducing the nitrogen oxide level in diesel engine exhaust gases with the aid of selective catalytic reduction, which ensures maximum utilization of the theoretically possible efficiencies of the SCR catalytic converters by the maximum possible provision of ammonia and/or a compound decomposing to form ammonia as the reducing agent, ammonia breakthroughs through the SCR system being systematically prevented, and which is also characterized by minimum need for complex calibration and data input.

The present invention provides a method for reducing nitrogen oxide levels in diesel engine exhaust gases with the aid of an exhaust gas treatment system which includes the following in the direction of flow of the exhaust gas in this order:

a. a device for feeding ammonia and/or a compound decomposing to form ammonia as the reducing agent into the exhaust gas to be cleaned;
b. one or more SCR catalytic converters which form a first SCR unit;
c. an ammonia sensor for determining the ammonia concentration in the exhaust gas downstream from the first SCR unit;
d. one or more SCR catalytic converters and/or an ammonia oxidation catalytic converter which form a second SCR unit;
e. and a nitrogen oxide sensor ($NO_x$ sensor) for determining the concentration of the nitrogen oxides ($NO_x$) in the exhaust pipe.

In the method according to the present invention, the quantity of ammonia and/or a compound decomposing to form ammonia to be fed into the exhaust gas is/are adjusted via the ammonia concentration determined with the aid of the ammonia sensor in the exhaust gas downstream from the first SCR unit and from the nitrogen oxide concentration in the exhaust pipe determined with the aid of the $NO_x$ sensor. The method is characterized in that the actual value of a virtual $NO_x/NH_3$ sensor is computed from the sensor signals of the ammonia sensor and the $NO_x$ sensor, this actual value being used as an input variable for a PI controller or a PID controller, which determines a quantity of ammonia and/or a compound decomposing to form ammonia to be fed by comparing the actual value and a predefined setpoint value.

BRIEF DESCRIPTION OF THE DRAWINGS

FIG. 4 shows a setpoint-actual value comparison.

FIG. 5 shows an NO comparison and $NH_3$ slip.

FIG. 6 shows the relationship between feed rate and feed limitation.

FIG. 7 shows the corresponding SCR catalytic converter temperature.

DETAILED DESCRIPTION

Figure 1:
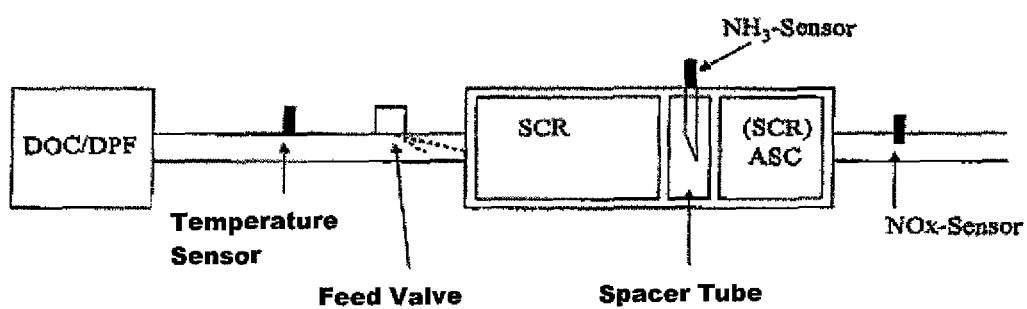
FIG. 1 schematically shows the construction of an exhaust gas treatment system.

FIG. 1 schematically shows the construction of an exhaust gas treatment system for carrying out the method according to an embodiment of the present invention.

The exhaust gas generated by the engine and to be cleaned might first go, via an upstream DOC and/or DPF and a mixing pipe, to a first SCR unit, which reduces the nitrogen oxides contained in the exhaust gas to be cleaned using ammonia from the aqueous urea solution (AdBlue®), and which is formed by one or more SCR catalytic converters. The exhaust gas temperature is measured with the aid of a suitable temperature sensor in the mixing pipe between the DOC/DPF and the first SCR unit. The feeding device for urea solution, used to feed a predetermined quantity of urea solution into the exhaust gas to be cleaned, is situated downstream from the temperature sensor. On the mixing tube, which includes the feeding device and, if necessary, static mixers for better homogenization of the exhaust gas to be cleaned and the reducing agent, a housing is situated, containing at least one SCR catalytic converter (first SCR unit), an ammonia sensor, and at least one ammonia oxidation catalytic converter (second SCR unit).

In one possible specific embodiment, the first SCR unit, including one or more SCR catalytic converters and the second SCR unit including at least one ammonia oxidation catalytic converter, are spatially separated from each other in the housing by a spacer tube. An inclined tube is situated in the center of this spacer tube for sampling the exhaust gas. Exhaust gas is removed from the system via this tube and transported to the measuring head of an ammonia sensor thereabove, so that the concentration of ammonia in the exhaust gas downstream from the first SCR unit may be reliably detected at any time. After passing through the spacer tube, the exhaust gas to be cleaned is conducted over the ammonia oxidation catalytic converter. Downstream from the ammonia oxidation catalytic converter, an $NO_x$ sensor is situated, with whose help the amount of residual nitrogen oxides prevailing at the discharge of the exhaust gas tract is determined.

In another specific embodiment, the ammonia oxidation catalytic converter is situated as a downstream zone on another SCR catalytic converter present in the second SCR unit. In this case, the above-described location of the ammonia sensor may be basically preserved. This location has the advantage that, due to the additional SCR catalytically active zone present downstream from the ammonia sensor, higher ammonia breakthroughs and thus higher reducing agent feeds may be allowed via the first, upstream SCR unit. This ensures optimum utilization of the SCR conversion capacity of the upstream SCR unit, without risking ammonia breakthroughs at the end of the exhaust gas duct.

Figure 2:
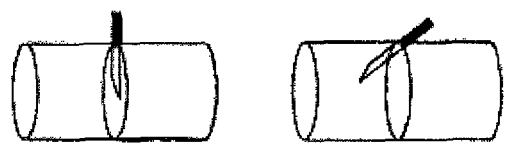
FIG. 2 schematically shows the borehole vertical or inclined in the honeycomb structure of the catalytic converter and the housing.

As an alternative, the ammonia sensor itself or an exhaust gas sampling tube leading to the sensor may be introduced into a bore hole in the honeycomb structure of the downstream catalytic converter on the boundary surface between the SCR catalytically active zone and the ammonia oxidation zone; the borehole may be vertical or inclined in the honeycomb structure of the catalytic converter and the housing, as FIG. 2 shows. In this case, the SCR catalytically active zone of the second, downstream catalytically active honeycomb structure is to be considered an integral part of the first SCR unit. Such an arrangement allows the reducing agent feed to be optimally adjusted over the entire available SCR catalytically active zone; the maximum allowable ammonia slip over the SCR catalytically active zones is to be adapted to the efficiency of the ammonia oxidation catalytic converter. The latter arrangement is especially advantageous when using oval catalyst geometries.

By introducing the ammonia sensor and regulating the reducing agent feed taking into account the actual ammonia breakthrough downstream from the SCR catalytic converter detected by the ammonia sensor, and the efficiency of the downstream ammonia oxidation catalytic converter, an always full utilization of the maximum SCR efficiency at the particular operating point becomes possible even under transient conditions. The reducing agent is always fed in such a way that a maximum allowable ammonia concentration is set on the ammonia sensor, which is at most such that the quantity of ammonia breaking through may be fully converted into nitrogen by the second SCR unit at any operating point, the second SCR unit including an ammonia slip catalytic converter or a zoned catalytic converter including an SCR catalytically active zone and an ammonia oxidation catalytically active zone. The regulation principle according to this embodiment of the present invention, involving the ammonia sensor signal and the signal of the $NO_x$ sensor situated in the exhaust pipe, is used here. This results in the optimum reducing agent feed rate, which ensures the full efficiency of the SCR catalytic converter and thus a minimum quantity of nitrogen oxides on the downstream $NO_x$ sensor. An integral part of the regulation principle and thus of the method according to this embodiment of the present invention is the feed rate of a reducing agent quantity that is intentionally greater than the one corresponding to the exact stoichiometrically required quantity of reducing agent corresponding to the efficiency of the SCR catalytic converter. An actual overfeed of the reducing agent is thus always achieved over the first, upstream SCR unit without ammonia breakthroughs being observable downstream from the ammonia slip catalytic converter situated downstream. The regulation principle according to this embodiment of the present invention, which is elucidated below in even greater detail, has the advantage that using the intentional reducing agent overfeed over the first SCR unit, optimum catalytic utilization of this unit is always ensured.

Furthermore, by using the method according to this embodiment of the present invention, a pre-control model for presetting a desired quantity of reducing agent may be completely dispensed with. Complex calibration and data entry operations such as the experimental determination of the maximum efficiency of the SCR catalytic converters or the storage capacity of the SCR catalytic converters, the knowledge of which and the data input into the control unit are a precondition for a reasonable pre-control of the reducing agent feed, are thus unnecessary.

In the method according to this embodiment of the present invention, the actual value of a virtual $NO_x/NH_3$ sensor is computed from the sensor signals of the ammonia sensor and of the $NO_x$-sensor. The NO sensor signal is first corrected by the $NH_3$ signal. This step is necessary, since $NO_x$ sensors are cross-sensitive to ammonia, i.e., without correction, the concentration of the ammonia contained in the exhaust gas is output by the $NO_x$ sensor as additional nitrogen oxide concentration. The $NO_x$ sensor signal is corrected by subtracting the ammonia concentration in the exhaust gas provided by the ammonia sensor from the nitrogen oxide concentration provided by the NO sensor. A corrected $NO_x$ value NOxCorDS is thus obtained, which provides the actual nitrogen oxide concentration in the exhaust gas in the exhaust pipe. The resulting value must not be less than zero by definition and is therefore limited to zero as the minimum value.

This limit is used whenever the ammonia concentration in the exhaust gas between the first SCR unit and the second SCR unit containing at least the ammonia oxidation catalytic converter is briefly greater than the measured nitrogen oxide concentration in the exhaust pipe, for example, during dynamic engine operation. As mentioned previously, the maximally allowable ammonia concentration in the exhaust gas upstream from the second SCR unit containing the ammonia oxidation catalytic converter has a maximum value such that it may be selectively and fully converted into nitrogen by the ammonia oxidation catalytic converter at any operating point. Thus, there is no risk of uncontrolled ammonia breakthroughs in the exhaust pipe.

In the next step, the obtained value NOxCorDS, which provides the actual nitrogen oxide concentration in the exhaust pipe, is multiplied by the factor (−1), resulting in a value −NOxCorDS. This value should be considered a first, uncorrected output value (actual value) of the virtual $NO_x/NH_3$ sensor, the virtual $NO_x/NH_3$ sensor providing the $NO_x$ concentrations in the exhaust pipe in the negative area, and the ammonia concentrations in the exhaust pipe in the positive area. In the transition area of the virtual sensor from $NO_x$ detection to $NH_3$ detection, the value −NoxCorDS is weighted with the aid of a previously filled characteristics map, which depends on the ammonia concentration downstream from the first SCR unit detected by the ammonia sensor.

The weighting factor, by which the value −NOxCorDS is to be multiplied, assumes values between 0 and 1. It is predefined from a characteristics map and is selected so that the weighting factor assumes the value 1 as long as the ammonia sensor detects an ammonia concentration in the exhaust gas downstream from the first SCR unit that is greater than zero, but does not exceed a first predefined, maximally allowable value. This first, predefined maximally allowable value is selected so that the resulting ammonia concentration upstream from the second SCR unit may be selectively and fully converted into nitrogen therein at any operating point of the engine. In this case the virtual $NO_x/NH_3$ sensor provides the negative value of the corrected and thus actual $NO_x$ concentration in the exhaust gas in the exhaust pipe.

In this phase the feed rate of the reducing agent is increased, so that the ammonia concentration downstream from the first SCR unit increases. Due to the actual efficiency of the first SCR unit increased by the overfeed, the actual $NO_x$ concentration value in the exhaust pipe drops, the actual value of the virtual $NO_x/NH_3$ sensor tends to zero, and the weighting of the corrected value −NOxCorDS tends to zero. Finally, the weighting factor assumes the value zero when the ammonia concentration in the exhaust gas downstream from the first SCR unit, detected by the ammonia sensor, reaches or exceeds a second predefined maximally allowable value. This second, predefined maximally allowable value is selected so that the ammonia concentration breaking through for this feed by the second SCR unit does not exceed a systemic threshold value or a threshold value predefined by law. Thus, this second value of the maximally allowable ammonia concentration in the exhaust pipe may amount to, for example, 10 ppm—a value that, according to the current legislation, is allowable as the average ammonia emission during an engine certification test.

If the corresponding ammonia concentration in the exhaust pipe is exceeded, the PI or PID controller present in the system is responsible for appropriately reducing the feed rate of the reducing agent.

The actual value of the virtual $NO_x/NH_3$ sensor generated in this way is used by the PI controller or the PID controller as the specified actual value.

The maximally allowable ammonia concentration in the exhaust gas downstream from the first SCR unit is preferably predefined as the setpoint value of the controller, which assumes values greater than zero in this case.

The maximally allowable $NO_x$ concentration in the exhaust pipe may also be selected as the setpoint value. In this case, the setpoint value would assume negative values. The limitation of the maximally allowable ammonia concentration in the exhaust gas downstream from the first SCR unit is ensured in this case by the specified values for the computation of the actual value of the virtual $NO_x/NH_3$ sensor. If the setpoint value of the controller were set equal to zero, this would be equivalent to the ammonia slip between the first and second SCR unit. Overfeeding the first SCR unit and thus an always adequate reducing agent supply could no longer be ensured in this case, since, in particular during operating phases where the temperature of the SCR catalytic converter drops and thus the physical ammonia storage capacity increases, the fed reducing agent is used, at least in part, to fill up the ammonia accumulator. This would result in suboptimum SCR efficiencies. In addition, the procedure in computing the actual value of the virtual $NO_x/NH_3$ sensor would result in greater fluctuations of the controller and thus of the reducing agent feed.

Particularly preferred is to predefine the setpoint value of the PI or PID controller as a function of the spatial velocity of the exhaust gas with respect to the first and possibly second SCR unit, as well as of the mean temperature of the first, and possibly second, SCR unit. Such a predefinition is advantageously provided in the form of an appropriate characteristics map. This procedure has the advantage that engine data may be input largely independently of different engine variants. Only recording of the exhaust gas mass flow in the control unit, for example, with the aid of an air mass sensor in the intake air in connection with the fuel injection quantity recorded anyway in the control unit, and/or with the aid of an exhaust gas mass flow sensor, and recording of the exhaust gas temperature are required. To compute the spatial velocity of the exhaust gas, only the catalytic converter volumes of the first and possibly second SCR unit are to be input.

The mean temperature of the first and second SCR unit may be determined either by using temperature sensors upstream and downstream from the first and second SCR unit, or by using one or more temperature sensors upstream from the first SCR unit in conjunction with a temperature model stored in the control unit software, the temperature model computing the mean temperature in the SCR units from the sensor signals, the exhaust gas mass flow, and the geometries and heat capacities of the exhaust gas treatment system.

A proportional component, an integral component, and a differential component, and a maximally possible feed rate for ammonia and/or a compound decomposing to form ammonia are preferably predefined as further input variables for the PI controller or PID controller. These input variables are also preferably a function of the spatial velocity of the exhaust gas with respect to the first and possibly second SCR unit, and of the mean temperature of the first and possibly second SCR unit.

The PI or PID controller is preferably equipped with a so-called "window function" to improve the controller speed. In this function, the proportional component, the integral component, and possibly the differential component of the controller are multiplied by a parametrizable amplification factor if the difference between setpoint value and actual value exceeds or drops below predefined threshold values. The amplification factors are selected so that adjustment to the setpoint value is accelerated.

Figure 3:
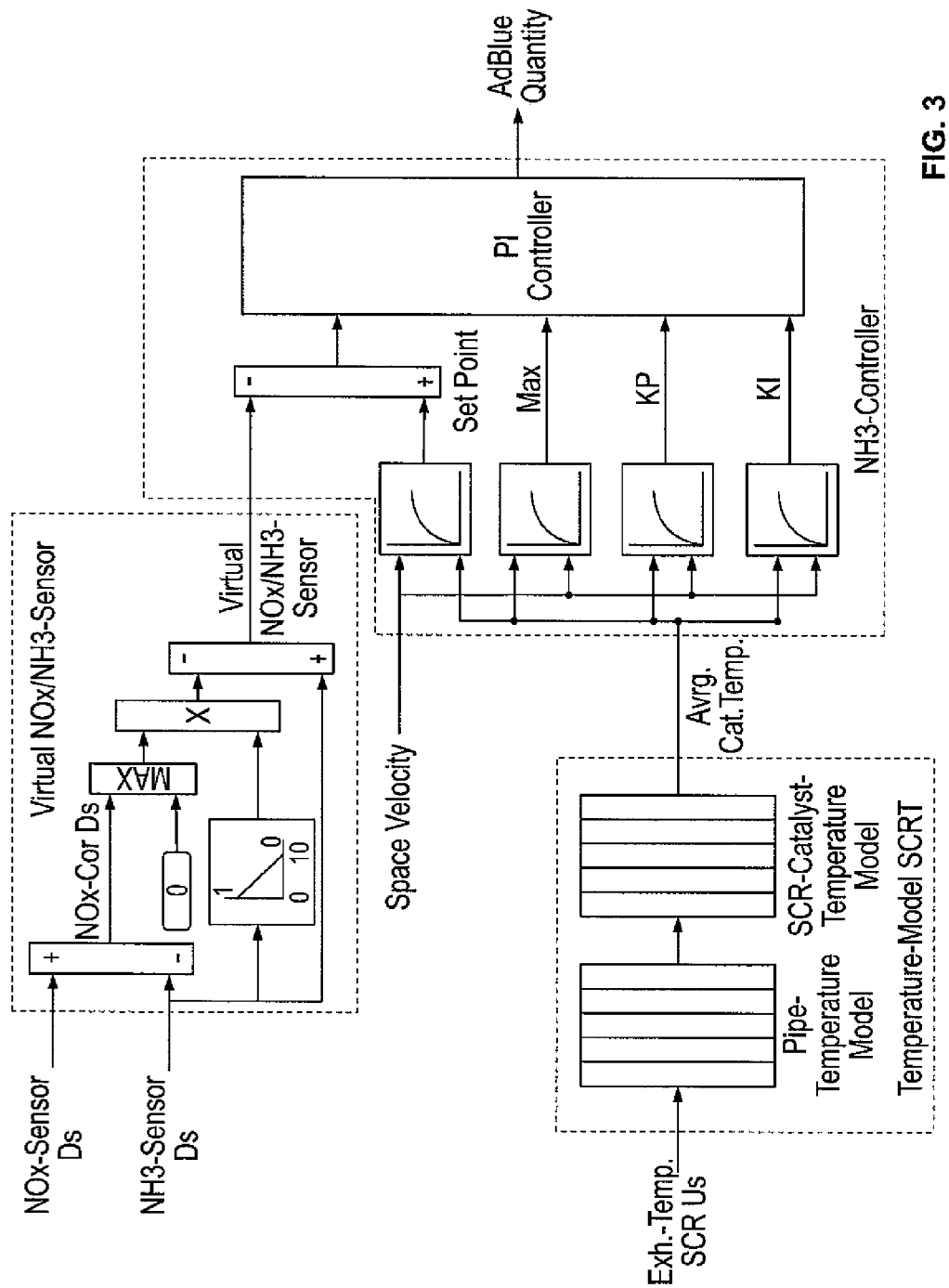
FIG. 3 shows, in a system diagram, the control steps necessary.

FIG. 3 shows, in a system diagram, the control steps necessary for the method according to this embodiment of the present invention as elucidated above.

By using the method according to this embodiment of the present invention, the $NO_x$ sensor upstream from the SCR catalytic converter additionally used in conventional systems and the exhaust gas counterpressure sensor upstream from the SCR catalytic converter required for correcting this sensor are no longer needed. Furthermore, the method according to this embodiment of the present invention offers the option for monitoring the quality of the reducing agent solutions used, without using the urea quality sensor in the reducing agent tank otherwise used for diagnostic purposes. Slight fluctuations in the concentration of the reducing agent solution may be compensated for by readjusting the feed rate of the reducing agent with the aid of the virtual $NO_x/NH_3$ sensor. A significantly low concentration of the reducing agent solution may be easily detected using plausibility compensation between the ammonia sensor and the downstream $NO_x$ sensor, since the ammonia sensor in this case would increase the reducing agent feed to above and beyond a predefined threshold value, while the downstream $NO_x$ sensor would detect clearly excessively high $NO_x$ values in the exhaust gas despite an assumedly controlled reducing agent feed rate.

Furthermore, when using the method according to this embodiment of the present invention it is advantageous to use the $NO_x$ sensor installed in the exhaust pipe for regulating the exhaust gas recirculation system. The maximum efficiency of the SCR system achieved as described above allows optimum setting of the exhaust gas recirculation rates and thus the achievement of the highest possible $NO_x$/soot ratios in the raw engine emission. In an exhaust gas cleaning system having an upstream diesel particulate filter, optimum passive soot regeneration rates may thus be ensured with the aid of $NO_2$. Fuel consumption and, simultaneously, performance of the engine, may also be optimized.

The method according to this embodiment of the present invention in which the signals of the ammonia sensor and $NO_x$ sensor in the exhaust pipe are combined to form a virtual $NO_x/NH_3$ sensor, which delivers the actual value for the PI or PID controller which controls the reducing agent quantity to be injected, ensures that the SCR system is operated under optimum conditions even in dynamic engine operation. Brief misfeeds, for example due to catalyst aging or component fluctuations (for example, feed valve accuracy, fluctuations in pump pressure) may be fully corrected.

In FIGS. 4 through 7, a reference drive of a vehicle according to an embodiment of the present invention or of a device having a diesel engine is illustrated.

Figure 4:
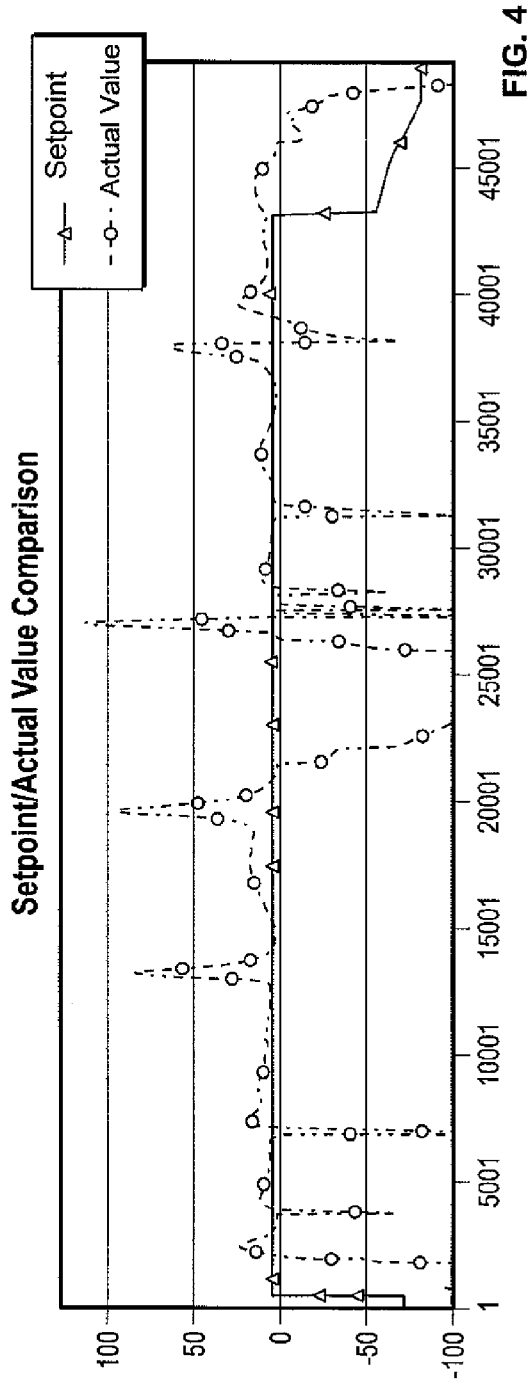
In FIGS. 4 through 7, a reference drive of a vehicle according to the present invention or of a device having a diesel engine is illustrated.

FIG. 4 shows a setpoint-actual value comparison.

Figure 5:
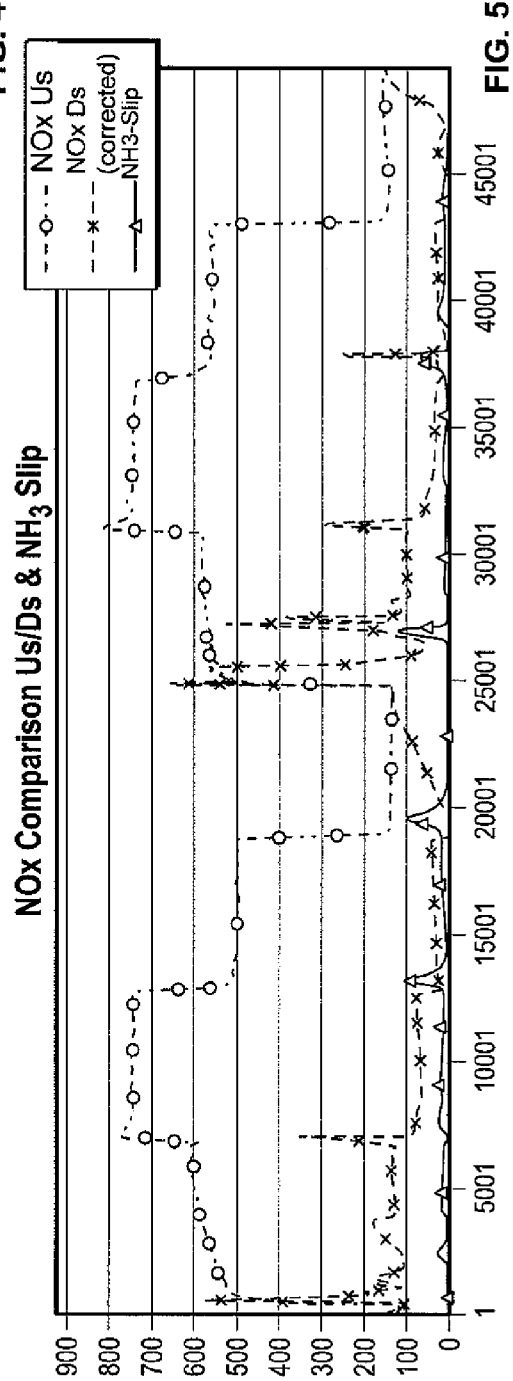

FIG. 5 shows an $NO_x$ comparison and $NH_3$ slip.

Figure 6:
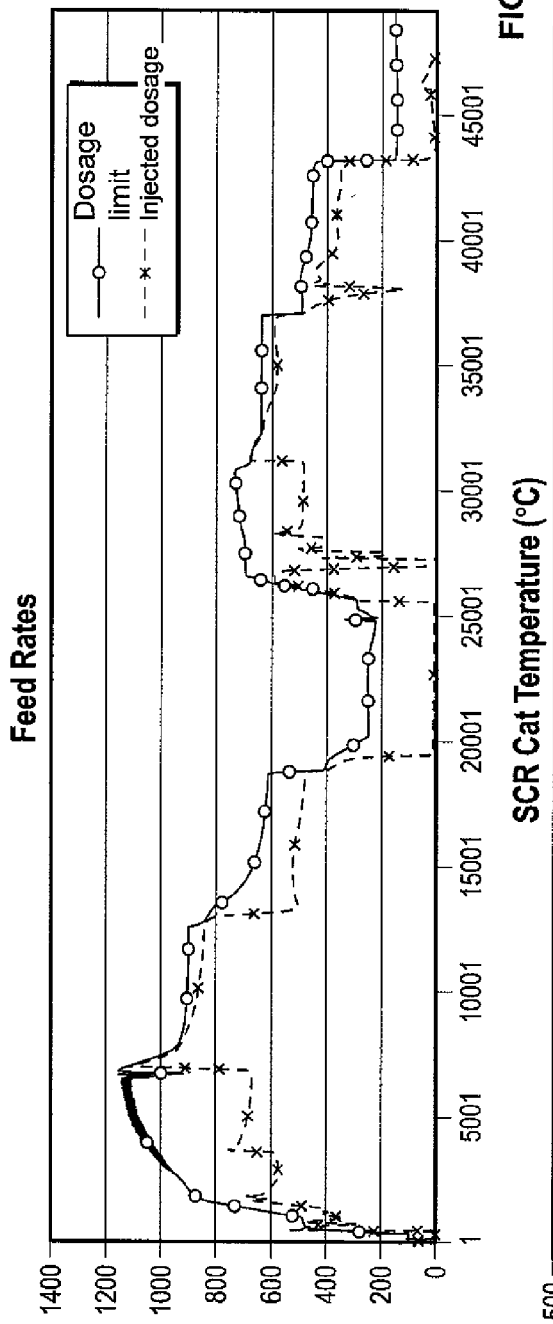

FIG. 6 shows the relationship between feed rate and feed limitation.

Figure 7:
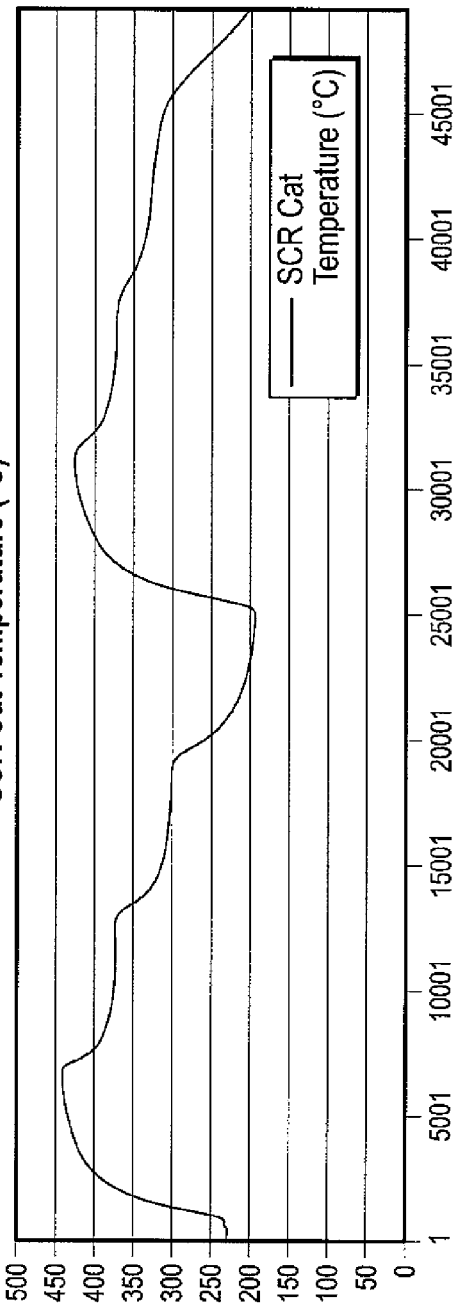

FIG. 7 shows the corresponding SCR catalytic converter temperature.

What is claimed is:

1. A method for reducing nitrogen oxide levels in diesel engine exhaust gases with the aid of an exhaust gas treatment system including, in the direction of flow of the exhaust gas, in this order:
a feeder for feeding at least one of ammonia and a compound decomposing to form ammonia as the reducing agent into the exhaust gas to be cleaned; one or more SCR catalytic converters which form a first SCR unit; an ammonia sensor for determining the ammonia concentration in the exhaust gas downstream from the first SCR unit; one or more SCR catalytic converters and/or an ammonia oxidation catalytic converter which form a second SCR unit; and a nitrogen oxide sensor ($NO_x$ sensor) for determining the concentration of the nitrogen oxides ($NO_x$) in the exhaust pipe, the method comprising:
setting the quantity of the at least one of ammonia and a compound decomposing to form ammonia to be fed into the exhaust gas using the ammonia concentration in the exhaust gas downstream from the first SCR unit determined with the aid of an ammonia sensor and the nitrogen oxide concentration in the exhaust pipe determined with the aid of an $NO_x$ sensor, the setting the quantity of the at least one of ammonia and a compound decomposing to form ammonia to be fed into the exhaust gas including computing an actual value of a virtual $NO_x/NH_3$ sensor from sensor signals of the ammonia sensor and the $NO_x$ sensor and using the actual value as an input variable for a PI controller or a PID controller determining the quantity of the at least one of ammonia and a compound decomposing to form ammonia to be fed by comparing the actual value and a predefined setpoint value; and
feeding the set quantity of the at least one of ammonia and the compound decomposing to form ammonia into the exhaust gas;
wherein the predefined setpoint value is a function of the spatial velocity of the exhaust gas with respect to at least the first SCR unit and of the mean temperature of at least the first SCR unit.

2. The method as recited in claim 1 wherein the computing the actual value of the virtual $NO_x/NH_3$ sensor comprises:
correcting the $NO_x$ sensor signal by the $NH_3$ sensor signal and computing a corrected $NO_x$ value NOxCorDS, which provides the actual $NO_x$ concentration in the exhaust pipe, the resulting value NOxCorDS being, by definition, not less than zero;
multiplying the value NOxCorDS by (−1) to form a resulting value −NoxCorDS; and
weighting the value −NOxCorDS by multiplying by a weighting factor specified from a characteristics map, the weighting factor assuming values between 0 and 1; the weighting factor being 1 as long as the ammonia sensor in the exhaust gas downstream from the first SCR unit detects an ammonia concentration which does not exceed a first predefined value of a maximally allowable ammonia concentration, the first predefined value of the maximally allowable ammonia concentration being selected so that the corresponding ammonia concentration in the exhaust gas to be cleaned may be fully converted into nitrogen in the second SCR unit at any operating point of the engine, the weighting factor assuming the value 0 when the ammonia concentration in the exhaust gas downstream from the first SCR unit, detected by the ammonia sensor, reaches or exceeds a second predefined value of the maximally allowable ammonia concentration.

3. The method as recited in claim 2 wherein the maximally allowable ammonia concentration in the exhaust gas downstream from the first SCR unit is predefined as the setpoint value, the setpoint value being greater than zero.

4. The method as recited in claim 1 wherein the predefined setpoint value is a function of a spatial velocity of the exhaust gas with respect to the first SCR unit and the second SCR unit and of a mean temperature of the first SCR unit and the second SCR unit.

5. The method as recited in claim 1 wherein a proportional component, an integral component and a maximally possible feed rate for the at least one of ammonia and a compound decomposing to form ammonia are predefined as further input variables for the PI controller or PID controller, the further input variables being a function of a spatial velocity of the exhaust gas with respect to the first SCR unit and of a mean temperature of the first SCR unit.

6. The method as recited in claim 5 wherein the proportional component and the integral component are multiplied by a parametrizable amplification factor if the difference between the setpoint value and the actual value exceeds or drops below predefined threshold values, so that the adjustment to the setpoint value is accelerated.

7. The method as recited in claim 1 wherein a proportional component, an integral component and a maximally possible feed rate for the at least one of ammonia and a compound decomposing to form ammonia are predefined as further input variables for the PI controller or PID controller, the further input variables being a function of a spatial velocity of the exhaust gas with respect to the first SCR unit and the second SCR unit and of a mean temperature of the first SCR unit and the second SCR unit.

8. The method as recited in claim 1 wherein the proportional component, the integral component and the differential component are multiplied by a parametrizable amplification factor if the difference between the setpoint value and the actual value exceeds or drops below predefined threshold values, so that the adjustment to the setpoint value is accelerated.

9. The method as recited in claim 1 wherein a proportional component, an integral component, a differential component and a maximally possible feed rate for the at least one of ammonia and a compound decomposing to form ammonia are predefined as further input variables for the PI controller or PID controller, the further input variables being a function of a spatial velocity of the exhaust gas with respect to the first SCR unit and the second SCR unit and of a mean temperature of the first SCR unit and the second SCR unit.

10. An exhaust gas treatment system comprising, in the direction of flow of an exhaust gas, in this order:
 a feeder for feeding at least one of ammonia and a compound decomposing to form ammonia as the reducing agent into the exhaust gas to be cleaned;
 one or more SCR catalytic converters which form a first SCR unit;
 an ammonia sensor for determining the ammonia concentration in the exhaust gas downstream from the first SCR unit;
 one or more SCR catalytic converters and/or an ammonia oxidation catalytic converter which form a second SCR unit;
 a nitrogen oxide sensor ($NO_X$ sensor) for determining the concentration of the nitrogen oxides ($NO_x$) in an exhaust pipe; and
 a PI controller or a PID controller,
 the quantity of the at least one of ammonia and a compound decomposing to form ammonia to be fed into the exhaust gas being set using the ammonia concentration in the exhaust gas downstream from the first SCR unit determined with the aid of an ammonia sensor, and the nitrogen oxide concentration in the exhaust pipe determined with the aid of an $NO_x$ sensor, the actual value of a virtual $NO_x/NH_3$ sensor being computed from the sensor signals of the ammonia sensor and the $NO_x$ sensor, the actual value being used as an input variable for the PI controller or PID controller, the PI controller or PID controller determining a quantity of the at least one of ammonia and a compound decomposing to form ammonia to be fed by comparing the actual value and a predefined setpoint value
 wherein the predefined setpoint value is a function of the spatial velocity of the exhaust gas with respect to at least the first SCR unit and of the mean temperature of at least the first SCR unit.

11. A vehicle or device comprising:
 a diesel engine; and
 the exhaust gas treatment system as recited in claim 10.

12. A method for reducing nitrogen oxide levels in diesel engine exhaust gases with the aid of an exhaust gas treatment system including, in the direction of flow of the exhaust gas, in this order:
 a feeder for feeding at least one of ammonia and a compound decomposing to form ammonia as the reducing agent into the exhaust gas to be cleaned; one or more SCR catalytic converters which form a first SCR unit; an ammonia sensor for determining the ammonia concentration in the exhaust gas downstream from the first SCR unit; one or more SCR catalytic converters and/or an ammonia oxidation catalytic converter which form a second SCR unit; and a nitrogen oxide sensor ($NO_X$ sensor) for determining the concentration of the nitrogen oxides ($NO_x$) in the exhaust pipe, the method comprising:
 setting the quantity of the at least one of ammonia and a compound decomposing to form ammonia to be fed into the exhaust gas using the ammonia concentration in the exhaust gas downstream from the first SCR unit determined with the aid of an ammonia sensor and the nitrogen oxide concentration in the exhaust pipe determined with the aid of an $NO_x$ sensor, the setting the quantity of the at least one of ammonia and a compound decomposing to form ammonia to be fed into the exhaust gas including computing an actual value of a virtual $NO_x/NH_3$ sensor from sensor signals of the ammonia sensor and the $NO_x$ sensor and using the actual value as an input variable for a PI controller or a PID controller determining the quantity of the at least one of ammonia and a compound decomposing to form ammonia to be fed by comparing the actual value and a predefined setpoint value;
 feeding the set quantity of the at least one of ammonia and the compound decomposing to form ammonia into the exhaust gas;
 correcting the $NO_x$ sensor signal by the $NH_3$ sensor signal and computing a corrected $NO_x$ value NOxCorDS, which provides the actual $NO_x$ concentration in the exhaust pipe, the resulting value NOxCorDS being, by definition, not less than zero;
 multiplying the value NOxCorDS by (−1) to form a resulting value −NoxCorDS; and
 weighting the value −NOxCorDS by multiplying by a weighting factor specified from a characteristics map, the weighting factor assuming values between 0 and 1; the weighting factor being 1 as long as the ammonia sensor in the exhaust gas downstream from the first SCR unit detects an ammonia concentration which does not exceed a first predefined value of a maximally allowable ammonia concentration, the first predefined value of the maximally allowable ammonia concentration being selected so that the corresponding ammonia concentration in the exhaust gas to be cleaned may be fully converted into nitrogen in the second SCR unit at any operating point of the engine, the weighting factor assuming the value 0 when the ammonia concentration in the exhaust gas downstream from the first SCR unit, detected by the ammonia sensor, reaches or exceeds a second predefined value of the maximally allowable ammonia concentration.

* * * * *